United States Patent [19]

Debortoli et al.

[11] 4,074,337

[45] Feb. 14, 1978

[54] PROTECTOR FOR TELECOMMUNICATION LINES

[75] Inventors: George Debortoli; Detlef Zimmermann, both of Ottawa, Canada

[73] Assignee: Northern Telecom Limited, Montreal, Canada

[21] Appl. No.: 736,172

[22] Filed: Oct. 27, 1976

[51] Int. Cl.[2] .......................... H02H 3/08; H02H 3/22

[52] U.S. Cl. ...................................... 361/124; 337/32; 361/119

[58] Field of Search ................. 361/124, 56, 117, 118, 361/119, 120; 337/15, 28, 29, 32, 33, 34

[56] References Cited

U.S. PATENT DOCUMENTS 3,852,539 12/1974 DeLuca .......................... 361/124 X

*Primary Examiner*—J D Miller
*Assistant Examiner*—Patrick R. Salce
*Attorney, Agent, or Firm*—Sidney T. Jelly

[57] ABSTRACT

A protector for telecommunications lines has an elongated housing with a ground bar extending up one side. End webs extend from the opposite ends of the ground bar across the housing, and a central web extends from the bar also across the housing. A protection device composed of an overcurrent device and an overvoltage device extends between each end web and the centre web, the devices on a common axis. In a particular arrangement a ground spring is attached to the ground bar at the side of the housing for connecting with a suitable housing of a protector field in a connector unit. Detent means can be provided to provide for positive partial withdrawal of a protector.

6 Claims, 7 Drawing Figures

PROTECTOR FOR TELECOMMUNICATION LINES

This invention relates to protectors for telecommunication lines, particularly to protect telephone lines and similar lines against excess voltage and current.

With the constant increase in telephone requirements and the consequential increase in space for protection and other equipment, there is a strong requirement for miniaturization, both to reduce future demands for space and to enable more equipment to be placed in existing space.

The present invention provides a protector which is very compact, while providing both excess voltage and current protection, is particularly suitable for use with compact connector structure, and provides other features normally provided, but in an improved manner.

Generally, the protector has the current protectors and the voltage protectors assembled in line on a common axis, a current protector and a voltage protector for each line. The assembly is contained within a metal ground bar which accepts the spring loads and provides a side ground contact. A positive detent is provided to give a positively positioned partial withdrawn condition for interconnection of the lines from the Central Office.

The invention will be readily understood by the following description of certain embodiments by way of example, in conjunction with the accompanying drawings, in which.

Figure 2:
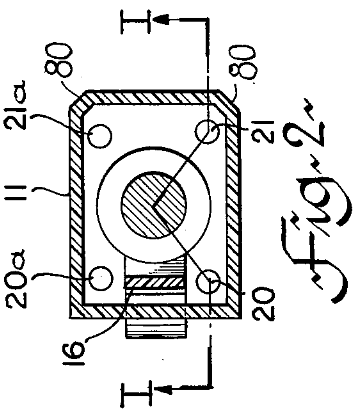
FIG. 2 is a cross-section on the line II—II of FIG. 1.
Figure 1:
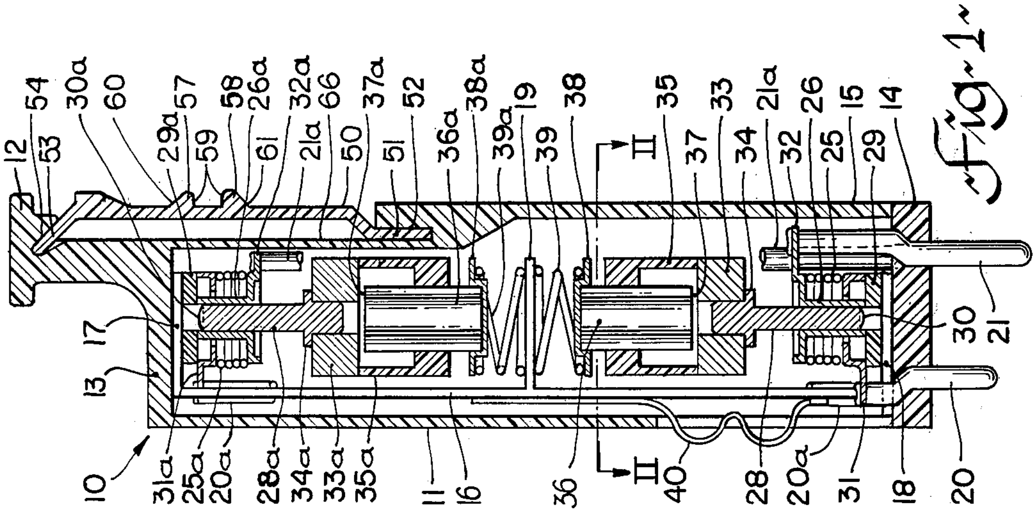
FIG. 1 is a longitudinal cross-section through one form of protector, on the line I—I of FIG. 2.

As illustrated in FIGS. 1 and 2, a protector indicated generally at 10 comprises a molded plastic housing 11 having a knob 12 at the closed outer end 13 and a base 14 attached to the inner end 15. Extending the length of the housing between closed end 13 and inner end 15 is a metal ground and retaining bar 16. Ground bar 16 has end webs extending across the housing, normal to the axis of the housing, as indicated at 17 and 18, and also a central web 19 extending across the housing midway between the end webs 17 and 18. Four pins extend through the base, forming two pairs 20 and **20*a*, 21 and 21*a*. Pins 20 and 20*a* are shorter than pins 21 and 21*a*, and comprise the connections to the central office. Pins 21 and 21*a* connect to the outside plant. One pin of each pair, pins 20*a* and 21*a* in FIG. 1, connect to protection devices positioned between the central web 19 and the end web 17 of the ground bar 16, and the other pair of pins, 20 and 21, connect to protection devices positioned between the central web 19 and the end web 18 of the ground bar 16. Pins 20*a* and 21*a*** extend up through the casing but are not shown in full in FIG. 1 for clarity.

The protection devices form two sets, each set having a current overload protector and a voltage overload protector. In the particular example illustrated, considering first the section between end web 18 and central web 19, an overcurrent protection device in the form of a heat coil 25 rests on the end web 18. The heat coil comprising a predetermined length of insulated wire, is wound on a metal bobbin 26 having a central bore in which is soldered a metal pin 28, the solder having a predetermined melting range. An insulating washer 29 is positioned between the bobbin 26 and the web 18, and the end 30 of the pin is held spaced from the web 18. One end of the coil 25 is attached to pin 20, via tab 31 and the other end of the coil is attached to pin 21 via tab 32.

The pin 28 extends from the heat coil 25 and in the present example carries a carbon ring 33 which rests on a flange 34 on the pin 28. A ceramic tube 35 rests on the carbon ring 33 and holds a carbon rod 36. A small gap 37 is provided between the opposed ends of the carbon ring 33 and the carbon rod 36. On the end of the carbon rod 36 remote from the carbon ring 33 is positioned a metal cap 38 and a compression spring 39 extends between the cap 38 and the central web 19.

A similar arrangement exists between end web 17 and central web 19 and the same references are applied to the same details, with the suffix "*a*" thereafter.

The operation is as follows. With a normal line current and voltage, there is a direct connection between pin **21 (21*a*) and pin 20 (20*a*) via the heat coil 25 (25*a*). With normal current and voltage no undue heating of the coil occurs. However, on occurrence of an overcurrent condition, on one or other or both lines, heating of the related heat coil 25 (25*a*) occurs. Melting of the soldered joint between bobbin 26 (26*a*) and pin 28 (28*a*) results and the pin 28 (28*a*) is pushed by the spring 39 (39*a*) via carbon rod 36 (36*a*), ceramic tube 35 (35*a*) and carbon ring 33 (33*a*). The end 30 (30*a*) of the pin contacts the related end web 18 or 17 of the ground bar 16. There is thus provided a direct path from pin 21 (21*a*) to ground via the metal bobbin 26 (26*a*) and the pin 28 (28*a*). The ground bar 16 is electrically connected to an electrical ground by means of a ground spring 40 attached to the ground bar 16**.

For an overvoltage condition, on one or the other line, or both lines, arcing occurs across the related gap, or gaps **37, 37*a*. In this case there is thus provided a path from pin 21 (21*a*) via metal pin 28 (28*a*), carbon ring 33 (33*a*), gap 37 (37*a*), carbon rod 36 (36*a*), end cap 38 (38*a*), and spring 39 (39*a*) to the central web 19 and thus to the ground bar 16 and ground spring 40. A short term overvoltage will merely result in the arcing across the gap 37 (37*a*) for the time of the overvoltage for example during a voltage surge. However if an overvoltage occurs for an extended period, heat from the carbon assembly will be transferred to the pin 28, melting the solder joint between the pin and the metal bobbin with the resultant release of the metal pin 28 (28*a*)**.

It is often desired that partial disconnection is required. For example if a particular pair of lines is to be disconnected from the central office — to remove service from a terminal for example, disconnection from the central office is effected but protection of the outside plant lines is still required. This is obtained, conventionally, by partial withdrawal of the protector. One pair of pins — the outside plant pins — are usually longer than the other pair. This is seen in FIG. 1 where the pins **21,(21*a*) are the outside plant pins and are longer than the central office pins 20, 20*a*.**

In many instances this partial withdrawal is not positive, in that the protector can be withdrawn too far — with no protection for the outside plant lines, or not withdrawn far enough, leaving the particular terminal still connected. Further in the confined space in a connector unit, a partially withdrawn protector can easily be knocked, the protector then being pushed in, or falling out.

The protector of the present invention is provided with a detent number which locates positively with a hole in the connector unit. A flexible elongated member 50 is positioned on one side of the protector at the outer end. In the particular example illustrated in FIG. 1 the inner end 51 of the member 50 fits in a groove or slot 52 formed in the housing 11. Similarly the outer end 53 of the member 50 fits in a further groove or slot 54 in the knob 12. There is a clearance space 55 between the main portion of the member 50 and the adjacent wall portion 56 of the housing 11. At a mid portion of the member 50 are two outwardly extending ribs 57 and 58 spaced a short distance apart. In the particular example the opposed faces 59 of the ribs are substantially normal to the axis of the member 50 while the outer faces 60 and 61 are inclined, giving the ribs 57 and 58 a somewhat wedgeshaped cross-section.

The protector is inserted in a protector section of a connector unit or block. A particular example is one described and illustrated in copending application Ser. No. 736,173 and filed on Oct. 27, 1976. Conveniently the protector section is of metal sheet positioned to provide a plurality of tubular receptacles in each of which a protector can be inserted. As the protector section is of metal the grounding springs 40 can be in direct contact with the metal protector section which in turn is connected to a ground connection. However it is possible to provide alternative grounding means in the protector section such as if the protector section is of a non-conducting material, or for other reasons.

In one wall of each opening, suitable holes are formed through which the ribs 57 and 58 can project. On initial entry of a protector into a receptacle the protector is pushed and the long pins 21, 21*a* enter related sockets. At this time and position the member 50 is deflected to enable the innermost rib 58 to enter the receptacle and then spring out with the rib 58 in a first hole. This deflection is assisted by the inclined surface 61. To fully insert the protector the member 50 is depressed, releasing the rib 58 and the protector pushed in fully. The shorter pins 20 enter related sockets and the ribs 57 and 58 each enter a hole in the wall of the receptacle, rib 57 being in the hole into which rib 58 previously fitted.

To partially withdraw a protector it is only necessary to pull on the knob 12. The inclined surface 60 of rib 57 deflects member 50 inwards and the ribs 57 and 58 move out of the related holes. As soon as rib 58 is opposite to the outer hole the member 50 springs outward and rib 58 enters the hole. Further outward movement is prevented by the face 59 on the rib 58 which acts as an abutment. Accidental movement in either direction is prevented by the faces 59. For complete withdrawal of a protector it is necessary to press the member 50 to disengage the rib 58 from the hole. There is thus a positive location for partial withdrawal. The protector cannot be accidently withdrawn completely, and once partially withdrawn is held securely in that condition against accidental reinsertion or complete withdrawal.

Figure 3:
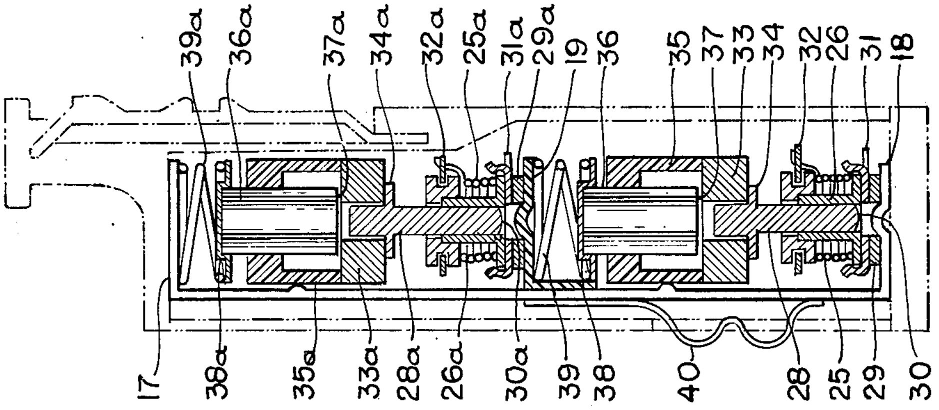
FIG. 3 is a longitudinal cross-section similar to that of FIG. 1, through another form of protector.
Figure 4:
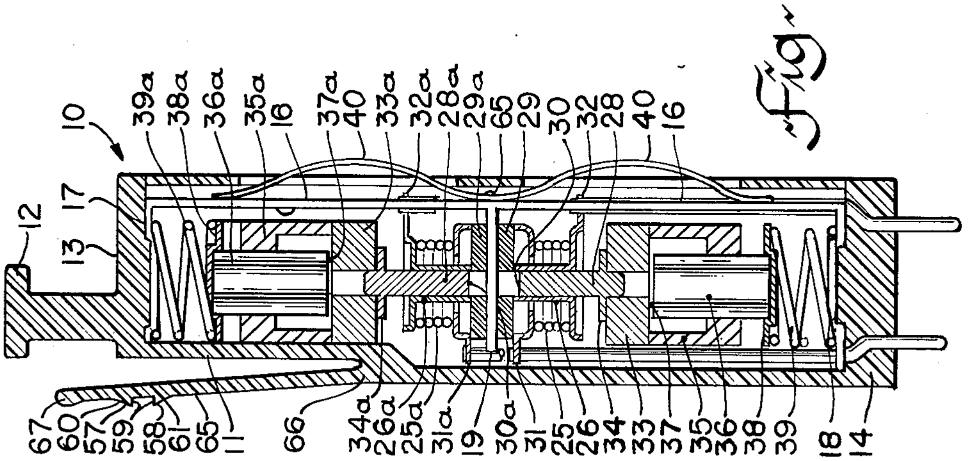
FIG. 4 is a longitudinal cross-section similar to that of FIG. 1, through a further form of protector.

FIGS. 3 and 4 illustrate alternate forms of protector and detent member. FIG. 3 is very similar to FIG. 1 and only the interior of the protector is shown, the housing omitted. The major difference in FIG. 3 is that instead of the heat coil 25, 25*a*, being at opposite ends, with the overvoltage protection devices between them on either side of the central web 19, the arrangement in each section of the protector is the same. Thus heat coil 25 rests on the inner web 18, insulated therefrom by the insulating washer 29, and metal pin 28, carbon ring 33, ceramic tube 35, carbon rod 36, end cap 38 and spring 39 extending between the heat coil and the central web 19. However for the outer section, heat coil 25*a* rests on the central web, insulated therefrom by the washer 29*a*, and the pin 28*a*, carbon ring 33*a*, ceramic tube 35*a*, carbon rod 36*a*, end cap 38*a* and spring 39*a* extend in that order between the heat coil and the outer end web 17. Also, the central web is shown as a separate member attached to the main portion of the ground and retaining bar 16, although this is shown only to illustrate an alternative form of construction.

FIG. 4 illustrates an alternative form of ground spring 40. Ground bar 16 as in FIG. 1 with an integral central web 19 extending normal to the main portion. Also, the positions of heat coils 25, 25*a* and the overvoltage devices are reversed as compared with FIG. 1, and a different form of detent is illustrated.

It is a feature of the present invention that the ground bar 16 contains all the components. All the loading, for example by the springs 39, are carried by the ground bar and are not transmitted to the plastic casing. This is particularly desirable in overheating situations as the ground bar will not distort readily whereas the plastic casing can melt or soften. In many forms of protector it is not possible to meet desirable specifications for overload requirements as the plastic casing distorts. Assembly of the components is also simplified.

The detent 65 is formed integral with the housing 11 and is cantilevered therefrom. Thus, as illustrated in FIG. 4, the detent is molded as part of the housing 11 being hingedly attached at its inner end 66 and extending outwards to end approximately at the level of the knob 12. In this instance the outer end 67 of the detent is free of the housing. Similar ribs 57 and 58 are formed on the detent 65 as in the form illustrated in FIG. 1 and the action for locating the protector in the partially withdrawn and fully inserted conditions is the same. The ground spring 40 extends for substantially the full length of the ground bar 16, having two arcuate portions 40*a* extending through apertures in the protector housing. This gives improved heat conductance to the protector section of the connector unit. The spring is spot welded to the ground bar 16 at 75, but may be attached by other means.

Figure 6:
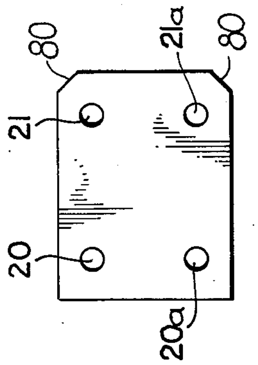
FIG. 6 is a base plan view of a protector, as in FIGS. 1, 3 or 4.
Figure 5:
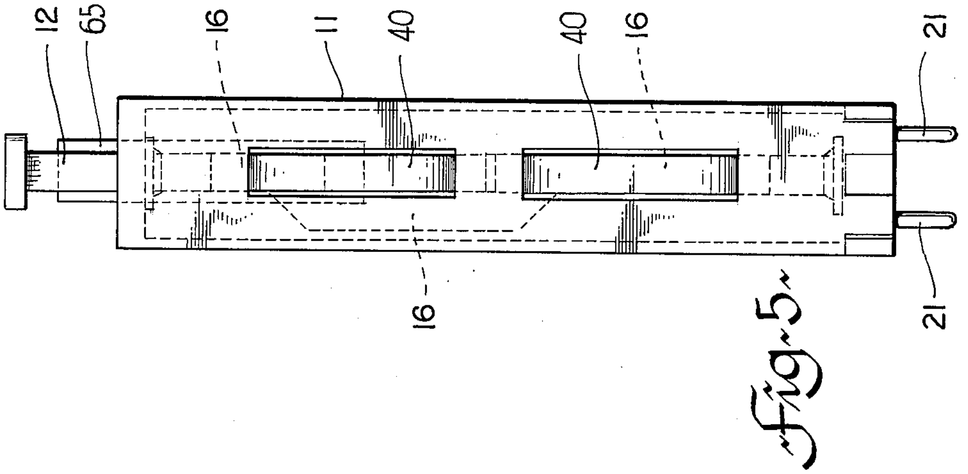
FIG. 5 is a side view of a protector as in FIG. 4.

FIG. 5 is a side view of the form of protector illustrated in FIG. 4, particularly showing the detent 65 and the ground spring contact 40. FIG. 6 is a plan view of a base of a protector, showing the pin positioning and is typical of the arrangement for all forms of protector, and also shows the shaping of the protector at 80, for cooperation with an associated formation on the housing of a protector section to ensure correct insertion.

Figure 7:
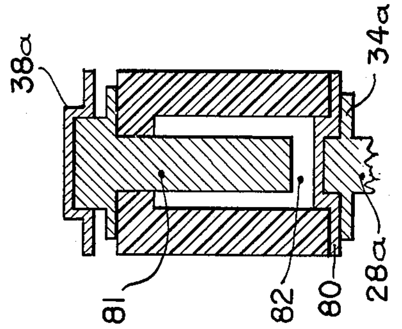
FIG. 7 is a partial view illustrating an alternative form of voltage overload device.

The carbon block and ceramic tube detail — items 33, 35 and 36 — can be replaced by a gas-tube device — a well known alternative. The gas tube can be made to the same essential dimensions and an example is illustrated in FIG. 7. As illustrated it comprises two electrodes 80 and 81 separated by an arc gap 82. The electrodes are sealed in a ceramic tube 83, with the space within the ceramic tube around the electrodes usually filled with a suitable gas. The form illustrated in FIG. 7 is shown for replacing the carbon block and ceramic tube detail 33*a*, 35*a* and 36*a* of FIG. 4.

A further alternative to replace the carbon block and ceramic tube overvoltage device is a solid state switching device. Such a device can also be made to directly replace the carbon block device without modification to the protector, if desired.

What is claimed:

1. A protector for telecommunication lines, comprising:

an electrically insulating housing;

a metallic ground bar extending substantially the length of the housing, said ground bar including first and second end webs extending normal to the longitudinal axis of said housing, and a central web extending from the centre of the ground bar normal to said axis;

a first protection device extending between said centre web and said first end web and a second protection device extending between said centre web and said second end web;

each of said protection devices comprising an overcurrent device and an overvoltage device on a common axis parallel to said axis of said housing;

two pairs of pins extending from a base of said housing, each pair composed of an outside plant pin for connection to outside plant equipment and a central office pin for connection to central office equipment;

said overcurrent device in said first protection device connected between one pair of outside plant and central office pins, said overcurrent device in said second protection device connected between the other pair of outside plant and central office pins;

said overvoltage device in said first protection device connected between one of said outside plant pins and said ground bar and said overvoltage device in said second protection device connected between the other of said outside plant pins and said ground bar;

ground means connected to said ground bar for connection to a ground connector;

the arrangement such that actuation of an overcurrent device directly connects the related outside plant pin to said ground bar, and actuation of an overvoltage device directly connects the related outside pin to said ground bar.

2. A protector as claimed in claim 1, said outside plant pins extending from said base of said housing longer than said central office pins, and means on said protector to predetermine the insertion position of said protector to only connect said outside plant pins to said outside plant equipment at one insertion condition and to connect said outside plant pins to said outside plant equipment and said central office pins to said central office equipment.

3. A protector as claimed in claim 1, said protector adapted for positioning in a protector field of a connector unit, said protector field including a metallic housing, said ground means connected to said ground bar comprising a spring member for contacting said metallic housing.

4. A protector as claimed in claim 2, said protector adapted for positioning in a protector field of a connector unit, said means for predetermining the insertion of said protector comprising a detent on said protector for engagement with a cooperative formation of said protector field.

5. A protector as claimed in claim 1, said overcurrent devices each comprising;

a coil, wound on metal bobbin;

a metal pin extending through said bobbin and soldered thereto, said coil positioned against one of said end webs and said central web of said ground bar, said metal bobbin insulated from said one web and an end of said metal pin spaced from said one web; and spring means acting on the other end of said pin, the arrangement such that upon overheating of said coil and melting of said solder, said pin is moved into contact with said ground bar, said metal bobbin also connected to the related outside plant pin.

6. A protector as claimed in claim 5, said overvoltage device positioned between said the other of said one of said end webs and said central web and said overcurrent device, said overvoltage device resting at one end on said other of said pin, said spring means acting on the other end of said overvoltage device, the arrangement such that on breakdown of the overvoltage device, said overcurrent device overheats and releases said pin to connect said overload device to said ground bar.

* * * * *